US006536959B2

(12) United States Patent
Kuhn et al.

(10) Patent No.: US 6,536,959 B2
(45) Date of Patent: Mar. 25, 2003

(54) COUPLING CONFIGURATION FOR CONNECTING AN OPTICAL FIBER TO AN OPTOELECTRONIC COMPONENT

(75) Inventors: Gerhard Kuhn, Köfering (DE); Alfred Hartl, Pettendorf (DE); Joachim Schulze, Berlin (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/736,099

(22) Filed: Dec. 13, 2000

(65) Prior Publication Data
US 2001/0004414 A1 Jun. 21, 2001

(30) Foreign Application Priority Data

Dec. 13, 1999 (DE) .......................... 199 61 624

(51) Int. Cl.$^7$ .................................. G02B 6/36
(52) U.S. Cl. ............................. 385/93; 385/33; 385/79
(58) Field of Search .................. 385/88, 89, 92, 385/93, 35, 34, 33

(56) References Cited

U.S. PATENT DOCUMENTS

| 4,616,899 A | 10/1986 | Schlafer |
| 4,995,687 A | 2/1991 | Nagai et al. |
| 5,274,723 A | 12/1993 | Komatsu |
| 5,526,455 A | 6/1996 | Akita et al. |
| 5,692,083 A | 11/1997 | Bennett |
| 5,937,122 A | 8/1999 | Ohki et al. |

FOREIGN PATENT DOCUMENTS

| DE | 40 22 076 A1 | 1/1992 |
| EP | 0 534 431 | 3/1993 |
| IE | 912 399 | 1/1992 |

*Primary Examiner*—Lynn Field
*Assistant Examiner*—Son V. Nguyen
(74) *Attorney, Agent, or Firm*—Laurence A. Greenberg; Werner H. Stemer; Ralph E. Locher

(57) ABSTRACT

A coupling configuration for connecting an optical fiber provided with a coupling end face at one end to an optoelectronic element is described. A coupling element is disposed between the end of the optical fiber and the optoelectronic element in order to reduce back-reflections. The coupling element, which is made of an optically transmissive material, is in physical contact with the coupling end face of the optical fiber, and its side facing the optoelectronic element has a surface region which reduces back-reflections. To simplify and shorten the coupling housing, the coupling element is of lens-like configuration, for example in the form of a ball, and is held directly in the coupling housing.

1 Claim, 3 Drawing Sheets

COUPLING CONFIGURATION FOR CONNECTING AN OPTICAL FIBER TO AN OPTOELECTRONIC COMPONENT

BACKGROUND OF THE INVENTION

Field of the Invention

The present invention relates to the field of couplers for connecting optical fibers to optoelectronic components. More specifically, the invention relates to a housing which accommodates an optical fiber end, provided with a coupling end face, and an optoelectronic element. A coupling element made of an optically transmissive material is disposed in the housing between the end of the optical fiber and the optoelectronic element in order to reduce back-reflections.

In the context of the invention, the optoelectronic element should be understood as being a transmitter or a receiver. When electrically driven, the optoelectronic element in the form of a transmitter converts the electrical signals into optical signals that are transmitted in the form of light signals. On receiving optical signals, the optoelectronic element in the form of a receiver converts these signals into corresponding electrical signals that can be tapped off at the output. In addition, an optical fiber is understood to be any apparatus for forwarding an optical signal with spatial limitation, in particular preformed optical fibers and so-called waveguides.

For optical data transmission at a high bit rate between an optoelectronic transmitter and an optoelectronic receiver, it is essential that back-reflections to the optoelectronic transmitter do not exceed a particular limit value defined in standards, in order to ensure fault-free operation of the optoelectronic transmitter.

In a known coupling configuration, the optical fiber, whose end is held in a plug, is in physical contact with the coupling element. That side of the coupling element that faces the optoelectronic element has a surface region that reduces back-reflections. In this context, the coupling element is in the form of an optical fiber portion whose axial extent is many times greater than its diameter. The optical fiber portion is held in a plug connector. That end of the optical fiber portion which faces the coupling end face ends at a first rounded end face of the plug connector, while that end of the optical fiber portion which faces the optoelectronic element ends at a second plug connector end face provided with a ground bevel. The coupling housing has a housing block which accommodates the optoelectronic element and to which a plug sleeve for holding the plug and the plug connector is attached. The plug sleeve is of a comparatively long axial configuration, in order to ensure that both the plug and the plug connector are held securely (see U.S. Pat. No. 5,937,122).

SUMMARY OF THE INVENTION

It is accordingly an object of the invention to provide a coupling configuration that overcomes the above-mentioned disadvantages of the prior art devices, in which a coupling housing is short and simple to produce.

With the foregoing and other objects in view there is provided, in accordance with the invention, a coupling configuration. The coupling configuration is formed of a coupling housing having a first region for accommodating an end of an optical fiber and a second region for accommodating an optoelectronic element. A coupling element made of an optically transmissive material is disposed in the coupling housing between the first region for accommodating the end of the optical fiber and the second region for accommodating the optoelectronic element. The coupling element is to be in physical contact with a coupling end face of the optical fiber when the optical fiber is inserted in the coupling housing. The coupling element has a side with a surface region which reduces back-reflections and the side faces the second region accommodating the optoelectronic element. The coupling element has a lens shape and is held directly in the coupling housing, and the coupling element couples the optical fiber to the optoelectronic element.

In accordance with the invention, the object is achieved in that the coupling element is of a lens-like configuration and is held directly in the coupling housing.

An essential advantage of the novel coupling configuration is that the axial extent of the lens-like coupling element is the same size as, or is even smaller than, its diameter required for optical coupling. This allows the coupling configuration overall to be shortened axially.

For simple mounting of the coupling element in the coupling housing and for simple alignment of the optical fiber, of the coupling element and of the optoelectronic element with respect to one another, it is advantageous for the coupling element to be in the form of a ball. The rotational symmetry of the ball results in that, irrespective of its axis position, it always has a spherical contact surface for reliable physical contact with the coupling end face of the optical fiber, and always has a spherical surface region on the side associated with the optoelectronic element. The spherical surface region ensures that the reflected light component is radiated back to the transmitter only to a very small degree.

A particularly simple and economical embodiment of the novel coupling configuration can be produced by forming the coupling element as an integral component of the housing. Therefore, for example, the coupling element can be produced as an integral part of the coupling housing in a joint injection-molding process. In this case, that side of the coupling element which faces the optoelectronic element may also have a ground bevel.

A particularly short physical form is possible, as an alternative to the embodiments described above, as a result of the coupling element being in the form of a plane-parallel plate whose side facing the optoelectronic element has a reflection-reducing coating and which is held directly in the coupling housing.

Other features which are considered as characteristic for the invention are set forth in the appended claims.

Although the invention is illustrated and described herein as embodied in a coupling configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
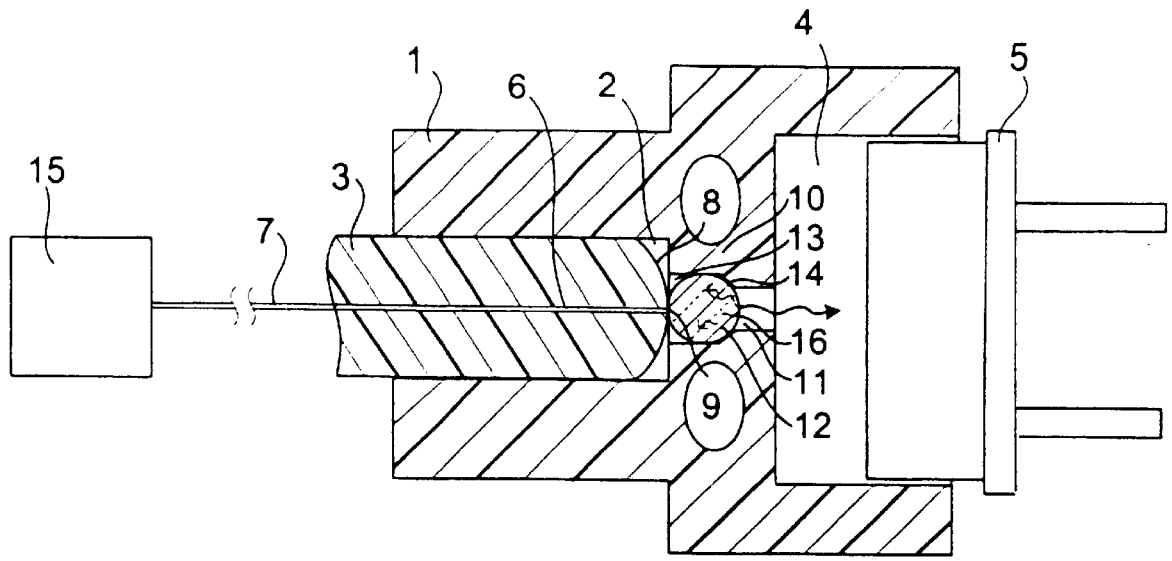
FIGS. 1 and 2 are diagrammatic, sectional views of coupling configurations in which a coupling element is in a form of a ball according to the invention.

In all the figures of the drawing, sub-features and integral parts that correspond to one another bear the same reference symbol in each case. Referring now to the figures of the drawing in detail and first, particularly, to FIGS. 1 and 2 thereof, there are shown embodiments of a coupling configuration having a coupling housing 1 of an integral configuration with a first cylindrical accommodating region 2, for accommodating an optical fiber plug 3, and a second cylindrical accommodating region 4 for accommodating an optoelectronic element 5. The optical fiber plug 3 accommodates one end 6 of a single-mode optical fiber 7 having a core diameter of approximately 5 to 9 μm. The optical fiber 7 ends at a rounded end face 8 of the optical fiber plug 3, with the result that a coupling end face 9 of the optical fiber 7 is also rounded. Between the first accommodating region 2 and the second accommodating region 4 there is a dividing wall 10 having a window-like recess 11 serving to accommodate and hold a coupling element 12 which is in the form of a ball.

According to FIG. 1, that side of the window-like recess 11 which faces the optical fiber 7 has a cylindrical hole 13 whose diameter is matched to the diameter of the coupling element 12 in the form of a ball and is smaller than the diameter of the optical fiber plug 3. The ball is inserted into the hole 13 from the first accommodating region 2. Serving as an axial stop for the ball is a conical constriction 14 of the recess 11, extending toward the optoelectronic element 5. The optoelectronic element 5 disposed in the second accommodating region 4 may be an optoelectronic receiver. In this case, light beams emitted by a transmitter 15 (shown only as a symbol in FIG. 1) and forwarded via the single-mode optical fiber 7 enter the coupling element 12 on account of the physical contact between the optical fiber 7 and the coupling element 12, with no occurrence of interfering back-reflection of the light beams into the optical fiber 7. The light beams pass through the coupling element 12 and impinge on a spherical surface region 16, so that only a very small part of the reflected light component is radiated back into the optical fiber 7 and hence to the transmitter 15.

Figure 2:
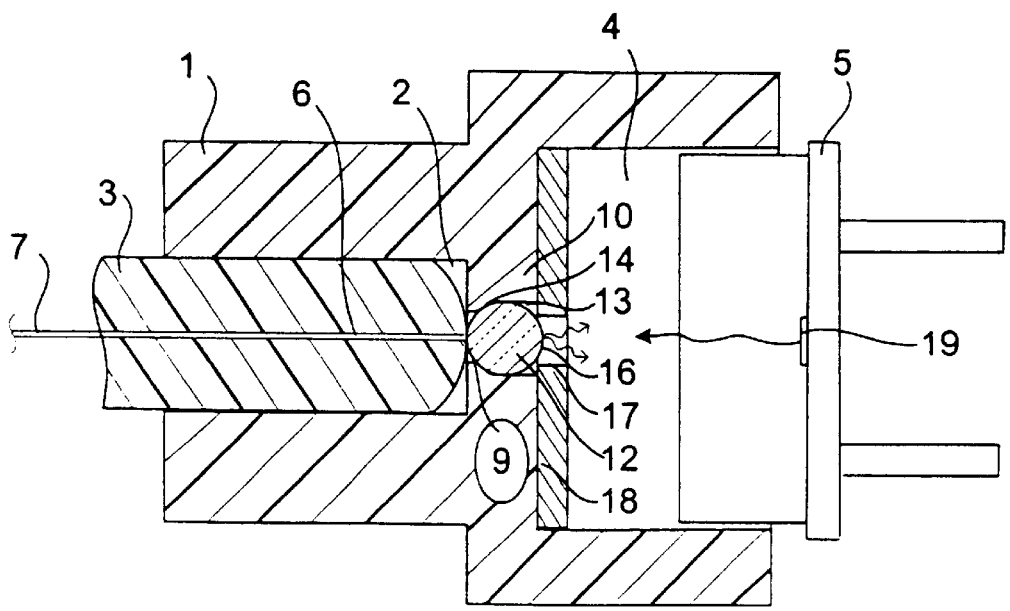

As FIG. 2 shows, the window-like recess 11 may also be configured such that the coupling element 12 in the form of a ball is inserted into the adjoining hole 13 in the window-like recess 11 from the second accommodating region 4. Serving as the axial stop for the ball in the direction of the optical fiber 7 is a conical constriction 14 which extends in this direction. Disposed in the second accommodating region 4 is a spring washer 18 which is provided with an opening 17 and absorbs the axial pressure acting on the ball as a result of the optical fiber plug 3 being pushed in. This makes it possible to prevent damage to the coupling end face 9 of the optical fiber 7 as a result of physical contact with the ball. The ball may take the form of a glass or plastic ball. The optoelectronic element 5 may be an optoelectronic transmitter. In this case, the beams emitted by the transmitter impinge on the spherically curved surface region 16 of the coupling element 12, with only a very small part of the reflected light component being radiated back onto an optically active zone 19 of the optoelectronic element 5, which is in the form of a transmitter.

Figure 3:
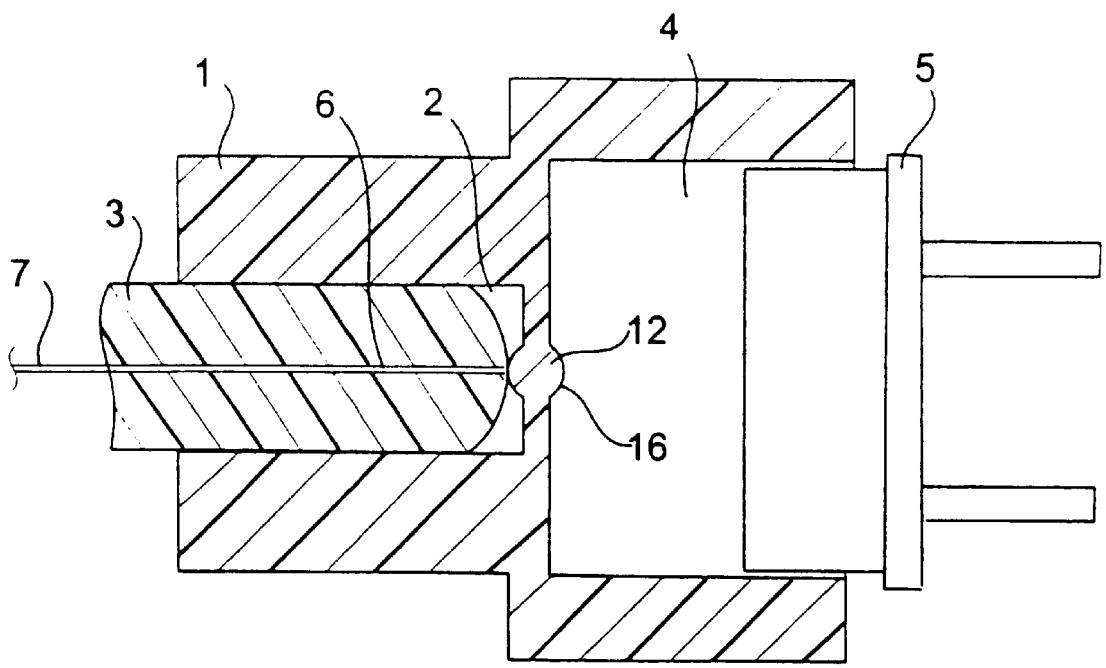
FIGS. 3 to 5 are sectional views of the coupling configurations in which the coupling element is an integral part of a coupling housing.
Figure 4:
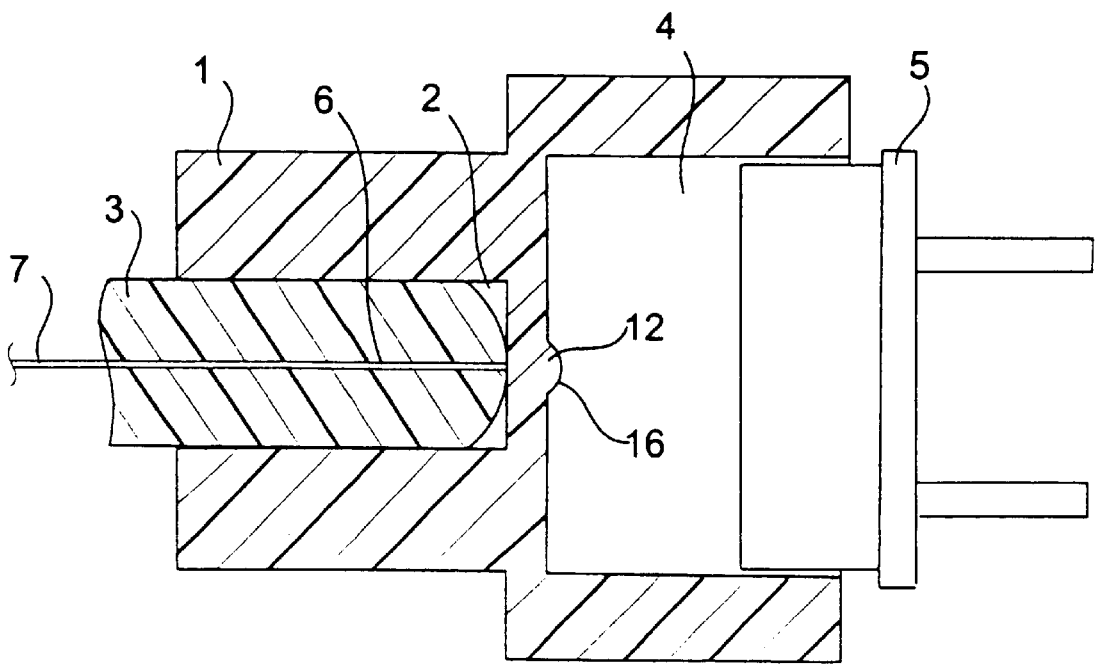
Figure 5:
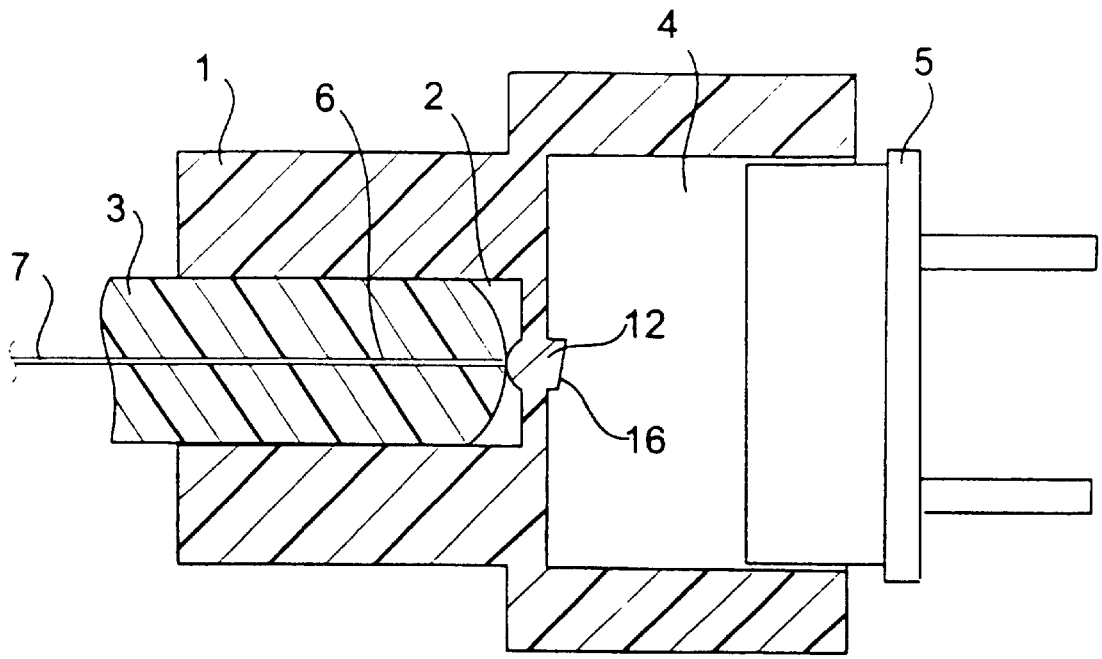

According to FIGS. 3 to 5, the coupling element 12 is formed as a lens, as an integral part of the coupling housing 1, using an optically transmissive material. The lens may be a biconvex lens, as shown in FIG. 3, or a planoconvex lens, as shown in FIG. 4. In the case of a planoconvex lens, the spherically curved surface region 16 faces the optoelectronic element 5. As an alternative to this, the lens may, as shown in FIG. 5, have a surface region 16 that is in the form of a ground bevel and faces the optoelectronic element 5.

Figure 6:
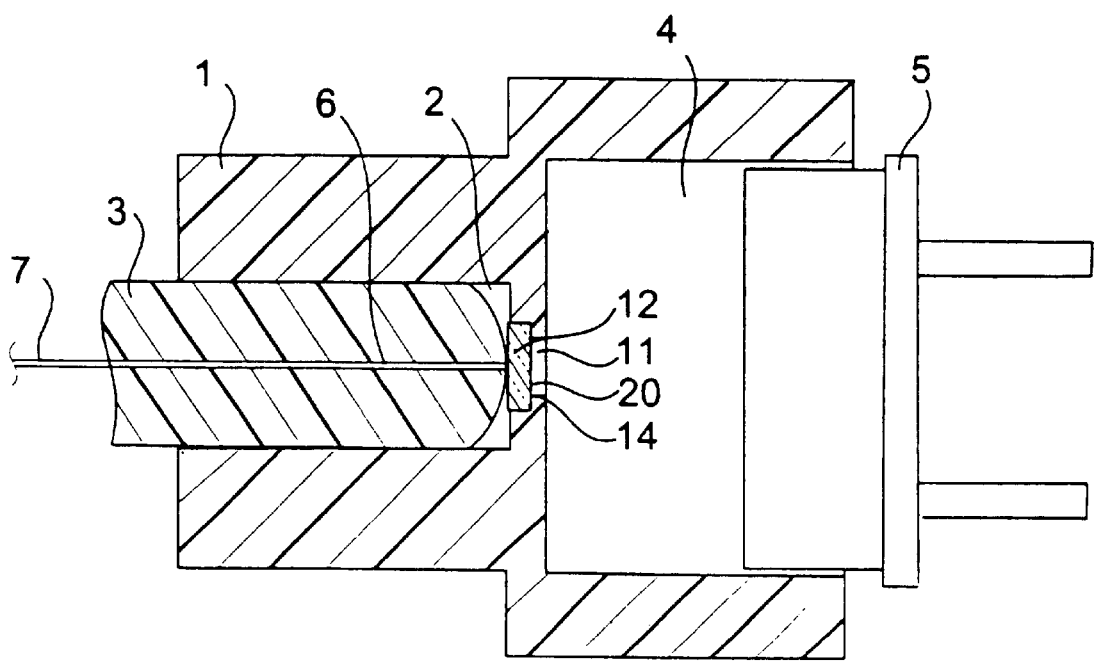
FIG. 6 is a sectional view of the coupling configuration having a plane-parallel plate.

According to FIG. 6, the coupling element 12 provided is a plane-parallel plate whose side facing the optoelectronic element 5 has a reflection-reducing coating 20. The reflection-reducing coating 20 attenuates the back-reflection of impinging light beams. The plane-parallel plate is inserted from the first accommodating region 2 into the window-like recess 11, which has a stepped constriction 14 in the direction of the optoelectronic element 5 and functions as a stop for the plane-parallel plate.

We claim:

1. A coupling configuration for connecting an optical fiber to an optoelectronic component, comprising:

a coupling housing having a first region for accommodating an end of the optical fiber and a second region for accommodating the optoelectronic component; and a coupling element made of an optically transmissive material and disposed in said coupling housing between said first region for accommodating the end of the optical fiber and said second region for accommodating the optoelectronic component, said coupling element being in physical contact with a coupling end face of the optical fiber upon the optical fiber being inserted in said coupling housing, said coupling element having a side with a surface region reducing back-reflections and said side facing said second region accommodating the optoelectronic component, said coupling element having a lens shape and being held directly in said coupling housing, said coupling element coupling the optical fiber to the optoelectronic component;

said coupling element being an integral component of said coupling housing, said side of said coupling element facing said second region having a ground bevel, and said side of said coupling element in physical contact with the coupling end face of the optical fiber having a spherical surface.

* * * * *